United States Patent [19]

Johnston et al.

[11] Patent Number: 4,686,125
[45] Date of Patent: Aug. 11, 1987

[54] FILM LAMINATE FOR STERILE FLEXIBLE CONTAINERS

[75] Inventors: William D. Johnston, Buffalo Grove; Leonard Czuba, Lombard; R. D. Webster, Barrington, all of Ill.

[73] Assignee: Baxter Travenol Laboratories, Inc., Deerfield, Ill.

[21] Appl. No.: 655,491

[22] Filed: Sep. 28, 1984

[51] Int. Cl.$^4$ .............. B65D 30/08; A61B 19/00; B32B 27/00
[52] U.S. Cl. .................. 428/35; 428/214; 428/215; 428/423.5; 428/424.8; 428/475.8; 428/476.3; 383/113; 604/408
[58] Field of Search ............ 428/423.5, 424.8, 475.8, 428/424.6, 214, 215, 476.3; 383/113; 604/408

[56] References Cited

U.S. PATENT DOCUMENTS

| | | | |
|---|---|---|---|
| 3,023,126 | 2/1962 | Underwood et al. | 428/35 |
| 3,423,231 | 1/1969 | Lutzmann | 428/475.8 |
| 3,489,631 | 1/1970 | Chen et al. | 156/244 |
| 3,715,074 | 2/1973 | Michel | 229/57 |
| 3,836,425 | 9/1974 | Whiting | 156/244 |
| 3,997,383 | 12/1976 | Bieler et al. | 156/244 |
| 4,092,202 | 5/1978 | Bergk et al. | 156/331 |
| 4,095,012 | 6/1978 | Schirmer | 428/474 |
| 4,104,404 | 8/1978 | Bieler et al. | 428/35 |
| 4,140,162 | 2/1979 | Gajewski et al. | 150/1 |
| 4,184,005 | 1/1980 | Bauriedel et al. | 428/420 |
| 4,210,686 | 7/1980 | Gajewski et al. | 428/35 |
| 4,268,531 | 5/1981 | Whiting, Jr. | 426/126 |
| 4,322,003 | 3/1982 | Long | 206/525 |
| 4,326,574 | 4/1982 | Pallaroni et al. | 150/8 |
| 4,352,850 | 10/1982 | Yamamoto et al. | 428/214 |
| 4,370,374 | 1/1983 | Raabe et al. | 428/216 |
| 4,397,916 | 8/1983 | Nagano | 428/461 |
| 4,399,173 | 8/1983 | Anthony et al. | 428/35 |
| 4,407,873 | 10/1983 | Christensen et al. | 428/35 |
| 4,410,595 | 10/1983 | Matsumoto et al. | 428/412 |
| 4,440,815 | 4/1984 | Zomorodi et al. | 428/35 |
| 4,479,989 | 10/1984 | Mahal | 604/408 |
| 4,482,585 | 11/1984 | Ohodaira et al. | 428/35 |

FOREIGN PATENT DOCUMENTS 0067420  12/1982  European Pat. Off. .

OTHER PUBLICATIONS

Cagle, Handbook of Adhesive Bonding, 1973, pp. 19-10, 19-12.

Primary Examiner—Roland E. Martin
Assistant Examiner—James J. Seidleck
Attorney, Agent, or Firm—John P. Kirby, Jr.; Paul C. Flattery; Robert M. Barrett

[57] ABSTRACT

A film laminate for flexible containers capable of containing a product to be maintained and accessed under sterile conditions. The laminate having an outside layer of linear low density polyethylene, a core layer of nylon, an inside layer of linear low density polyethylene and two layers of a polyurethane adhesive for bonding the layers.

32 Claims, 2 Drawing Figures

FILM LAMINATE FOR STERILE FLEXIBLE CONTAINERS

BACKGROUND OF THE INVENTION

This invention relates to a film laminate structure for flexible containers. In particular, this invention relates to a multilayer laminate film structure for flexible containers capable of containing a liquid to be maintained and removed under sterile conditions.

Flexible containers are utilized in the medical industry for containing, inter alia, parenteral solutions, dialysis solutions, frozen drugs, nutrition products, respiratory therapy products, and plasma. Because these containers are utilized to contain fluids or solids that are introduced into a patient's body, it is necessary for the containers to be: essentially transparent; flexible; essentially free of extractables; and capable of maintaining the product contained therein under sterile conditions until the product is accessed or removed from the flexible container.

It is also important that the film used in constructing these containers is sufficiently strong so that containers constructed from the film have sufficient strength. Moreover, if the laminate film is to be constructed into a commercially viable flexible container, it is necessary that the flexible film can be run on some type of commercial production machine. One such machine is a form, fill and seal packaging machine. A form, fill and seal packaging machine seals the film to create a container having at least two sides. The side seals are typically effectuated by sealing the inside layer of the film to itself.

It may also be desirable to attach a fitment on the film structure to create a flexible container with a fitment. The fitment is typically heat sealed to the film. Accordingly, it may also be necessary that the film structure is heat sealable on its outside layer so that the fitment may be sealed thereto.

Because the film laminate is to be utilized for flexible containers that house a medical product that is to be introduced into a patient's body, it is necessary that the film structure does not contain chemicals that will be extracted by the medical product. This is an especially critical consideration when choosing an adhesive for bonding the laminate layers together. If a fitment is sealed to the outside wall of the container it is possible that there will be fluid communication between the product and the inner layers of the laminate. Thus, if the adhesive contains possible hazardous components that may be extractable, the film may not include a fitment sealed to the outside wall.

A further consideration in choosing the proper film for creating a flexible container is the product to be housed. In applications of the film as a frozen drug bag one must be concerned with the glass transition state of the film. Frozen drug bags are stored at approximately −25° C. which falls below the glass transition state of certain film structures, e.g. polyvinyl chlorides. Accordingly, if these films are used for frozen drug bags they will be very brittle and may easily break.

Thus, there is a need for a film laminate structure for creating a sterile flexible container that overcomes the disadvantages of the prior art.

SUMMARY OF THE INVENTION

The present invention provides a film laminate for flexible containers capable of containing a product to be maintained and accessed under sterile conditions. The film laminate comprises an outside layer of linear low density polyethylene, a core layer of nylon, an inside layer of linear low density polyethylene, and two layers of a polyurethane adhesive that bonds the outside and inside layers to different sides of the core layer.

Preferably the inside and outside layers have a thickness of approximately 40 to about 100 microns and the core layer has a thickness of approximately 10 to about 40 microns. The polyurethane adhesive layers preferably have a thickness of approximately 1 to about 10 microns. The preferred thickness of the film laminate is approximately 130 to about 200 microns. Preferably the inside and outside layers have a density of approximately 0.91 to 0.94 grams/cubic centimeters.

In a preferred embodiment the film laminate can be formed into, and function as a frozen drug bag.

The outside and inside layers of the film laminate preferably include an antioxidant, stabilizer, antiblocking agent, and slip agent.

Accordingly, it is an advantage of the present invention to provide a multilayer laminate structure that may be utilized to create a sterile flexible container.

Another advantage of the present invention is to provide a film structure that can be utilized to produce a container that has heat sealable surfaces both inside and outside.

A still further advantage of the present invention is that it can be utilized to produce a container with a fitment heat sealed to its outside surface.

An additional advantage of the present invention is to provide a film laminate structure that includes an adhesive that may be utilized to house medical products.

Moreover, an advantage of the present invention is to provide a film laminate structure that can be utilized to produce a flexible bag that may house parenteral products including intravenous solutions, frozen drugs, nutrition products, respiratory therapy products, and plasma.

A further advantage of the present invention is to create a film laminate structure that can be utilized in a form, fill and seal packaging machine to create a flexible container.

A still further advantage of the present invention is to create a film laminate structure that has sufficient strength to create flexible containers for housing medical products.

Another advantage of the present invention is that the outside film laminate structure has a sufficiently low glass transition state so that it can function as a frozen drug bag without becoming too brittle or subject to puncture and pinhole formation.

A further advantage of the present invention is that it provides a three layer laminate film with two adhesive layers that may be utilized to create a sterile flexible container.

Moreover, an advantage of the present invention is that the film laminate has a thickness of approximately 130 to about 150 microns.

A still further advantage of the present invention is that it provides an outside layer and inside layer constructed from a linear low density polyethylene containing a minor amount of a copolymerizing olefin such as 1-hexene, and including a stabilizer, an antiblock agent, an antioxidant, and a slip agent.

Additional features and advantages are described in, and will be apparent from, the Detailed Description of the Presently Preferred Embodiments and from the drawings.

DETAILED DESCRIPTION OF THE PRESENTLY PREFERRED EMBODIMENTS

The film structure of the present invention is utilized to produce flexible containers capable of containing a fluid or solid to be maintained and extracted under sterile conditions. These containers typically consist of a liquid containment body defined by thermally sealed walls. The containers are utilized to package, inter alia, parenteral products including intravenous solutions, dialysis solutions, frozen drugs, nutrition products, respiratory therapy products, and plasma, The preferred film structure of this invention is a multilayer laminate structure designed to package parenteral products including intravenous solutions, dialysis solutions, frozen drugs, nutrition products, respiratory therapy products, and plasma.

Figure 1:
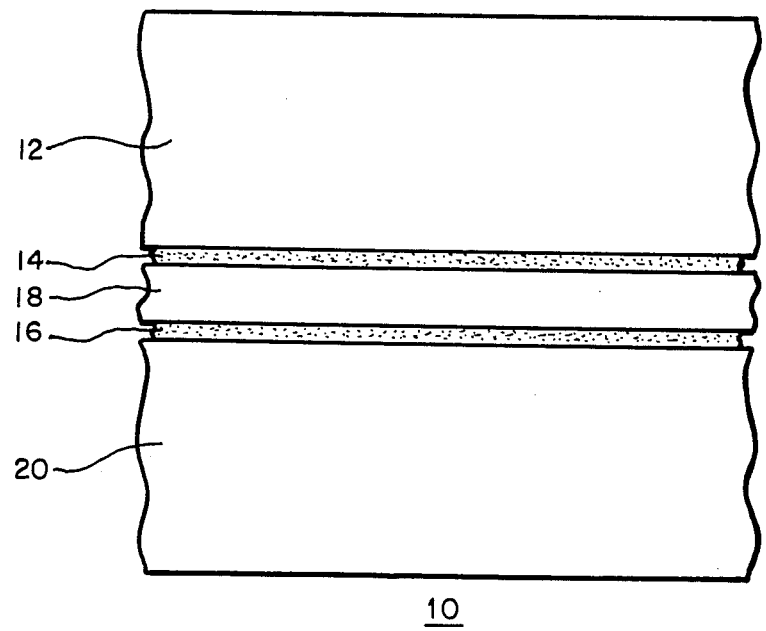
FIG. 1 illustrates a schematic cross-sectional view of an embodiment of the film laminate structure of this invention.
Figure 2:
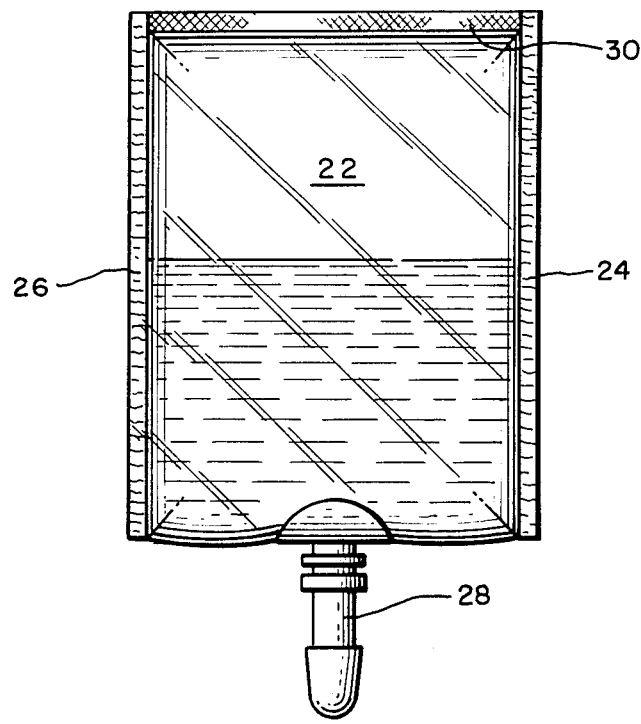
FIG. 2 illustrates a perspective view of a flexble container constructed from the film laminate of this invention.

Referring to FIG. 1, a presently preferred embodiment of the film laminate structure 10 of the present invention is illustrated. The film laminate structure 10 includes an outside layer 12, a first adhesive layer 14, a core layer 18, a second adhesive layer 16, and an inside layer 20. As will be described in more detail below, the adhesive layers 14 and 16 bond the outside and inside layers 12 and 20 respectively, to the core layer 18. As also discussed in more detail below, as illustrated in FIG. 2, the film laminate structure 10 may be utilized to create a flexible container 22.

The outside and inside layers 12 and 20 are constructed from polyethylene. Preferably, the outside and inside layers 12 and 20 are a linear low density polyethylene. As used herein, linear low density means that the polyethylene is made by low pressure polymerization and has a density of between approximately 0.91 to about 0.94 grams/cubic centimeter. The preferred density of the linear low density polyethylene is between approximately 0.915 to about 0.930.

The preferred linear low density polyethylene contains approximately 2% to about 10% by weight 1-hexene. In a most preferred embodiment, the polyethylene contains approximately 5% by weight 1-hexene. Other olefinic comonomers with 4 to 18 carbon atoms also function satisfactorily. Examples of these olefins are 1-octene, 1-butene, 1-pentene, and 4-methyl-1-pentene which may be present as approximately 5% to about 11% by weight of the linear low density polyethylene.

Because the film laminate 10 is to be utilized to produce flexible containers through a commercial packaging machine, it is important that the outside layer 12 has a sufficiently low coefficient of friction. The outside layer 12 must have a low coefficient of friction to ensure that it flows smoothly through the processing machine, e.g., a form, fill and seal packaging machine. Preferably the outside layer 12 has a coefficient of friction of approximately 0.2 to about 0.4 as measured by ASTM test D-1894 between the outside layer and a stainless steel surface. The preferred coefficient of friction of the outside layer 12 is approximately 0.25.

To provide the linear low density polyethylene with a sufficiently low coefficient of friction the polyethylene is slip modified by adding a fatty acid amide additive that acts like a lubricant and lowers the coefficient of friction of the film. The preferred fatty acid amides have 8 to 22 carbon atoms. Oleic amide has been found to modify the linear low density polyethylene sufficiently to produce the required coefficient of friction. Preferably approximately 0.03% to about 0.15% by weight of oleic amide is added to the linear low density polyethylene.

An important consideration for the outside layer 12 and inside layer 20 is their thickness. In order to create a flexible container 22 the inside layer 20 must be sealed to itself to create at least two walls 24 and 26. Moreover, if a fitment 26 is to be attached to the flexible container 22 it may be desirable that the fitment 26 is attached to the outside layer 12. Preferably, the outside layer 12 and inside layer 20 have a thickness of between approximately 40 to about 100 microns. The preferred thickness of the outside and inside layers 12 and 20 is between approximately 50 and about 70 microns. This thickness affords: a good seal; good clarity; pinhole resistance; a good tensile strength; sufficient impact strength; and provides good flexibility for the film laminate 10.

It is not necessary that the outside layer 12 and inside layer 20 have the same thickness. However, if the outside layer 12 and inside layer 20 have the same thickness, and the layers have approximately the same coefficient of friction, this provides a film structure that resists curl and is a more versatile film laminate 10 in that it may be fed into the packaging machine with either side facing in either direction.

The linear low density polyethylene layers 12 and 20 provide properties to the film laminate structure 10 that allows the laminate to be utilized to produce a frozen drug bag. The low temperature properties, as well as the excellent heat sealability of linear low density polyethylene makes it suitable for use in producing a frozen drug bag. These properties are important in view of the fact that the temperature of the frozen drug bag when it is shipped is −25° C. For typical prior art flexible containers, e.g., those made from polyvinyl chloride, at this temperature the containers fall below the glass transition state, and therefore the materials of which the containers are made are very brittle. Thus, the flexible bags will easily break. In contrast, linear low density polyethylene's glass transition state is below −100° C., and accordingly, when used as a frozen drug bag it will not fall below its glass transition state.

Preferably, the outside layer and inside layer 12 and 20 contain an antioxidant. The antioxidant functions to provide needed properties when the resin pellets are produced. Four antioxidants have been found to provide satisfactory results: tetrakis[methylene-3-(3',5'-di-tert-butyl-4'-hydroxy phenyl)propionate] methane (manufactured by Ciba-Geigy under the name Irganox 1010); n-octadecyl-beta-(4'-hydroxy-3', 5'-di-tert-butyl phenyl) propionate (manufactured by Ciba-Geigy under the name Irganox 1076); butylated hydroxytoluene; 1,3,5-trimethyl-2,4,6-tris[3,5-di-tert-butyl-4-hydrobenzyl] ("Ethyl" antioxidant 330 manufactured by Ethyl Corporation); and tetrakis(2,4-di-tert-butylphenyl)-4-4'- biphenylene diphosphate (manufactured by Sandoz under the name Sandostab P-EPQ). The preferred antioxidants are Irganox 1010 and P-EPQ. Preferably approximately 0.03% to about 0.15% by weight of the antioxidants are added to the linear low density polyethylene.

The linear low density polyethylene preferably also contains a stabilizer and an antiblocking agent. The stabilizer provides needed properties during the production of the film from the resin pellets. Preferably the stabilizer is calcium stearate and comprises approximately 0.02% to about 0.06% by weight of the polyethylene copolymer. The antiblocking agent prevents the film from sticking together. Preferably the antiblocking agent is magnesium silicate and comprises approximately 0.11% to about 0.15% by weight. Other antiblocking agents that have been found to produce satisfactory results are aluminum hydroxide and magnesium hydroxide.

The core layer 18 of the present invention is a polyamide, preferably nylon. The preferred nylon for the core layer 18 is a biaxially oriented nylon. A biaxially oriented nylon 6, such as the one manufactured by Unitika Ltd. of Osaka, Japan has been found to produce satisfactory results. Other nylons may also be utilized - preferably low extractable nylons; examples of such nylon and cast nylon, nylon 6-6, nylon 11, and nylon 12; all of these nylons may be either oriented or cast nylons.

As used herein, biaxially oriented nylon means that the nylon film has been extruded and stretched in both directions. This ensures that the molecules of nylon are biaxially oriented. This provides the film laminate structure 10 with increased mechanical qualities, i.e., pinhole resistance; tear resistance, (resistance to the start of a tear); and stretch resistance.

Preferably, the core layer 18 has a thickness of between approximately 10 to about 40 microns. The preferred thickness of the core layer 18 is approximately 15 to about 20 microns. Preferably, the biaxially oriented nylon includes a slip agent. The preferred slip agent silicon dioxide.

The first adhesive layer 14 bonds the outside layer 12 to the core layer 18; and the second adhesive layer 16 bonds the inside layer 20 and core layer 18 to each other. Preferably the adhesive is an aliphatic polyurethane. The preferred aliphatic polyurethane is a polyester-urethanediol resin manufactured by Takeda Chemical Industries Co., Ltd. under the name Takelac A-38 or Takelac A-520.

The adhesive layers 14 and 16 create a strong bond between the polyethylene layers 12 and 20 and the core layer 18. Preferably the bond strength is at least 500 gms/inch of force. Most preferably, the bond strength is at least 700 gms/inch of force. The aliphatic polyurethane adhesive layers 14 and 16 also provide the following desirable properties to the laminate film structure 10: transparency; flexibility; low temperature resistance; processability; and initial tackiness.

The preferred thickness of each of the adhesive layers 14 and 16 is approximately 1 to about 10 microns. The most preferred thickness of each of the adhesive layers 14 and 16 is approximately 3 to about 5 microns.

It has been found that the adhesive layers 14 and 16 may be utilized even if a fitment 28 is attached to the outside layer 12. If the fitment 26 is attached to the outside layer 12, the product within the container 22 will be in fluid communication with the adhesive layers 14 and 16. It has been found the adhesive layers 14 and 16 of the film laminate 10 are nonleaching and nontoxic.

The total thickness of the film laminate 10 is preferably approximately 130 to about 200 microns. This provides a film laminate that: is flexible; has good strength; has good heat seals, good clarity; pinhole resistance; and sufficient impact strength.

The film laminate 10 of this invention is preferably produced by dry lamination. Preferably, the dry lamination process utilizes a two-component curing system. The adhesive is tacky at the time of combination, and is cured at room temperature.

Referring now to FIG. 2, the flexible container 22 constructed from the film laminate 10 of this invention is illustrated. As illustrated, the inside layer 20 is heat sealed together on itself at walls 24, 26 and 30. Due to the construction of the inside polyethylene layer 20, a strong heat seal is created.

Also, as illustrated, a fitment 28 may be sealed to the outside layer 12 of the container 26. Preferably, the fitment 32 is heat sealed to the outside layer 12. Due to the construction of the outside layer 12, a strong heat seal is created. Thus, the present invention creates a film laminate structure 10 that can run through a form, fill and seal packaging machine to create flexible containers including a fitment that can house a medical product to be maintained and extracted under sterile conditions.

By way of example, and not limitation, three examples of the film laminate 10 will now be set-forth:

EXAMPLE 1

Step 1

Laminate a 60 micron blown film of linear low density polyethylene (the polyethylene has 5% by weight 1-hexene as its copolymer component and the following additives: antioxidants-Irganox 1010 and P-EPQ, stabilizer-calcium stearate, antiblock-magnesium silicate and slip agent-oleic amide) to a 15 micron film of oriented nylon 6 polymer (the nylon 6 includes a silicon dioxide slip agent) using 3 to 4 microns of an aliphatic urethane adhesive by way of a dry-bonding process.

Step 2

Take the two layer laminate made in Step 1 and using the same dry bonding lamination process, laminate another 60 micron layer of the same polyethylene mentioned above to the other side of the oriented nylon film. In each step, the adhesive is applied to the nylon film and "dried" before combining with the polyethylene.

Step 3

The three layer laminate is then cured in a controlled temperature environment such as an oven to completely cure the adhesive layers and allow full bonding of the layers.

EXAMPLE 2

Step 1

Laminate a 60 micron cast film of linear low density polyethylene (the polyethylene has 10% by weight 4-methyl-1-pentene as its copolymer component and the following additives: antioxidants-Irganox 1010 and Irganox 1076, stabilizer-calcium stearate, antiblock-magnesium hydroxide and aluminum hydroxide, and slip agents-$C_8$ to $C_{22}$ higher fatty acid amides) to a 15 micron film of oriented nylon 6 polymer (the nylon 6 polymer includes a silicon dioxide slip agent) using 3 to 4 microns of an aliphatic urethane adhesive by way of a dry-bonding process.

Step 2

Take the two layer laminate made in Step 1 and using the same dry bonding lamination process, laminate another layer of 60 microns of the same polyethylene mentioned above to the other side of the oriented nylon film. In each step, the adhesive is applied to the nylon film and "dried" before combining with the polyethylene.

Step 3

The three layer laminate is then cured in a controlled temperature environment such as an oven to completely cure the adhesive layers and allow full bonding of the layers.

EXAMPLE 3

Step 1

Laminate a 60 micron cast film of linear low density polyethylene (the polyethylene has 10% by weight 4-methyl-1-pentene as its copolymer component and the following additives: antioxidants-Irganox 1010 and Irganox 1076. stabilizer-calcium stearate, antiblock-magnesium hydroxide and aluminum hydroxide, and slip agents-$C_8$ to $C_{22}$ higher fatty acid amides) to a 30 micron film of cast nylon 6 polymer using an aliphatic urethane adhesive by way of the dry lamination process.

Step 2

Take the two layer laminate made in Step 1 and using the same dry lamination process, laminate another layer of 60 microns of the same polyethylene mentioned above to the other side of the cast nylon film. In each step, the adhesive is applied to the nylon film and "dried" before combining with the polyethylene.

Step 3

The three layer laminate is then cured in a controlled temperature environment such as an oven to completely cure the adhesive layers and allow full bonding of the layers.

It should be understood that various changes and modifications to the preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

We claim:

1. A laminate film structure having sufficient flexibility, strength, heat sealability, and slip properties for producing on a packaging machine a flexible container for containing a liquid to be administered into a patient's body comprising:
   a layer of a linear low density polyethylene for forming an outside layer of the flexible container;
   a layer of biaxially oriented nylon for forming a core layer of the flexible container;
   a layer of a linear low density polyethylene for forming an inside layer of the flexible container; and
   the outside layer and inside layer being bonded to the core layer by separate layers of polyurethane adhesive.

2. The film structure of claim 1 wherein the outside and inside polyethylene layers have a density of between approximately 0.91 to about 0.94 g/cm$^3$.

3. The film structure of claim 1 wherein the outside layer includes approximately 0.05% to about 0.15% by weight of a fatty acid amide containing 8 to 22 carbon atoms.

4. The film structure of claim 3 wherein the fatty acid amide is an oleic amide.

5. The film structure of claim 1 wherein the outside layer has a coefficient of friction of between 0.2 to 0.4.

6. The film structure of claim 1 wherein the polyurethane adhesive comprises a polyester-urethanediol resin.

7. The film structure of claim 6 wherein the inside and outside layers are bonded to the core layer with at least 500 gms/inch of force as delamination strength.

8. The film structure of claim 1 wherein the outside and inside linear low density polyethylene includes:
   an antioxidant;
   a stabilizer; and
   an antiblocking agent.

9. The film structure of claim 8 wherein:
   the antioxidant is selected from the group consisting of tetrakis[methylene-3-(3'5'-di-tert-butyl-4'-hydroxy phenyl)propionate] methane, n-octadecyl-beta-(4'-hydroxy-3',-5'-di-tert-butylphenyl) propionate, butylated hydroxytoluene, Ethyl antioxidant 330, and tetrakis (2,4-di-tert-butylphenyl)-4,4'-biphenylene disphosphonite;
   the stabilizer is calcium stearate; and
   the antiblocking agent is selected from the group consisting of magnesium hydroxide, aluminum hydroxide, and magnesium silicate.

10. The film structure of claim 1 wherein:
    the outside layer has a thickness of approximately 40 to about 100 microns;
    the inside layer has a thickness of approximately 40 to about 100 microns; and
    the core layer has a thickness of approximately 10 to about 40 microns.

11. The film structure of claim 10 wherein the thickness of the film structure is approximately 130 to about 200 microns.

12. A flexible container capable of containing a fluid or solid under sterile conditions having a body portion with opposed, perpherally sealed walls forming the container the walls being constructed from a five layer laminate comprising:
    an outside layer constructed from linear low density polyethylene;
    a core layer constructed from a biaxially oriented polyamide;
    an inside layer constructed from linear low density polyethylene; and
    two layers of a urethane adhesive bonding the inside and outside layers to the core layer on opposed sides thereof.

13. The flexible container of claim 12 wherein the outside layer and inside layer have a density of approximately 0.91 to about 0.94 g/cm$^3$.

14. The flexible container of claim 12 wherein the film laminate has a thickness of approximately 130 to about 200 microns.

15. The flexible container of claim 12 wherein the outside layer contains a slip agent.

16. The flexible container of claim 12 wherein the outside layer has a coefficient of friction of approximately 0.2 to about 0.4.

17. The flexible container of claim 12 wherein:
   the outside layer has a thickness of approximately 40 to about 100 microns;
   the inside layer has a thickness of approximately 40 to about 100 microns; and
   the core layer has a thickness of approximately 10 to 40 microns.

18. The flexible container of claim 17 wherein the outside and inside layer have approximately the same thickness.

19. The flexible container of claim 17 wherein each of the layers of urethane adhesive have a thickness of approximately 1 to about 10 microns.

20. The flexible container of claim 19 wherein the inside and outside layers are bonded to the core layer with at least 500 gms/inch of force as the delamination strength.

21. The flexible container of claim 12 including a fitment sealed to the outside layer.

22. The flexible container of claim 12 wherein the polyamide of the core layer is nylon.

23. The flexible container of claim 22 wherein the nylon is biaxially oriented nylon.

24. A laminate film structure having sufficient flexibility, strength, heat sealability, and slip properties for producing in a packaging machine flexible containers having fitments attached thereto and capable of containing a liquid to be maintained under sterile conditions comprising:
   an inner layer constructed from polyethylene, the inner layer having a thickness of approximately 40 to 100 microns;
   a core layer constructed from biaxially oriented polyamide, the core layer having a thickness of approximately 10 to 40 microns;
   an outer layer constructed from polyethylene and having a thickness of approximately 40 to 100 microns, the outer layer including a slip agent and having a coefficient of friction of approximately 0.2 to about 0.4; and
   two layers of an aliphatic polyurethane bonding the inner and outer layers to the core layer.

25. The film structure of claim 24 wherein the polyethylene is a linear low density polyethylene.

26. The film structure of claim 25 wherein the polyethylene contains approximately 2% to 10% by weight 1-hexene.

27. The film structure of claim 25 wherein the density of the linear low density polyethylene copolymer layers is approximately 0.91 to about 0.94 g/cm$^3$.

28. The film structure of claim 25 wherein the linear low density polyethylene copolymer layers include the following additives:
   an antioxidant;
   a stabilizer;
   a slip agent; and
   an antiblocking agent.

29. The film structure of claim 24 wherein the aliphatic polyurethane adhesive has a thickness of between approximately 1 to about 10 microns.

30. The film structure of claim 29 wherein the bond strength of the polyethylene layers to the core layer is at least 500 gms/inch of force to delaminate.

31. The film structure of claim 24 wherein the thickness of the film structure is approximately 130 to about 200 microns.

32. A laminate film structure having sufficient flexibility, strength, heat sealability, and slip properties for producing on a packaging machine flexible containers having fitments attached thereto and capable of containing a frozen product to be maintained under sterile conditions comprising:
   an inner layer constructed from polyethylene, the inner layer having a thickness of approximately 40 to 100 microns;
   a core layer constructed from biaxially oriented polyamide, the core layer having a thickness of approximately 10 to 40 microns;
   an outer layer constructed from polyethylene and having a thickness of approximately 40 to 100 microns, the outer layer including a slip agent and having a coefficient of friction of approximately 0.2 to about 0.4;
   two layers of an aliphatic polyurethane bonding the inner and outer layers to the core layer; and
   the glass transition state of the laminate film structure being less than −25° C.

* * * * *

UNITED STATES PATENT AND TRADEMARK OFFICE
CERTIFICATE OF CORRECTION

PATENT NO. : 4,686,125
DATED : August 11, 1987
INVENTOR(S) : William D. Johnston, et al It is certified that error appears in the above-identified patent and that said Letters Patent are hereby corrected as shown below:

Front page

[75] Inventors: William D. Johnston, Buffalo Grove, Ill.; Leonard Czuba, Lombard, Ill.; R.D. Webster, Barrington, Ill.; Yasuhiko Hori, Kawasaki, Japan; Masanori Nagata, Tokyo, Japan; Shigeki Imano, Kawasaki, Japan.

Signed and Sealed this

Eighth Day of March, 1988

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,686,125

DATED : August 11, 1987

INVENTOR(S) : William D. Johnston, et al.

It is certified that error appears in the above-identified patent and that said Letters Patent are hereby corrected as shown below:

Front page, first column:

Assignees: Fujimori Kogyo Co., Inc., Tokyo, Japan, and Baxter Travenol Laboratories, Inc., Deerfield, Illinois Signed and Sealed this Twenty-sixth Day of April, 1988

Attest:

DONALD J. QUIGG

Attesting Officer     Commissioner of Patents and Trademarks